Patented Jan. 2, 1945

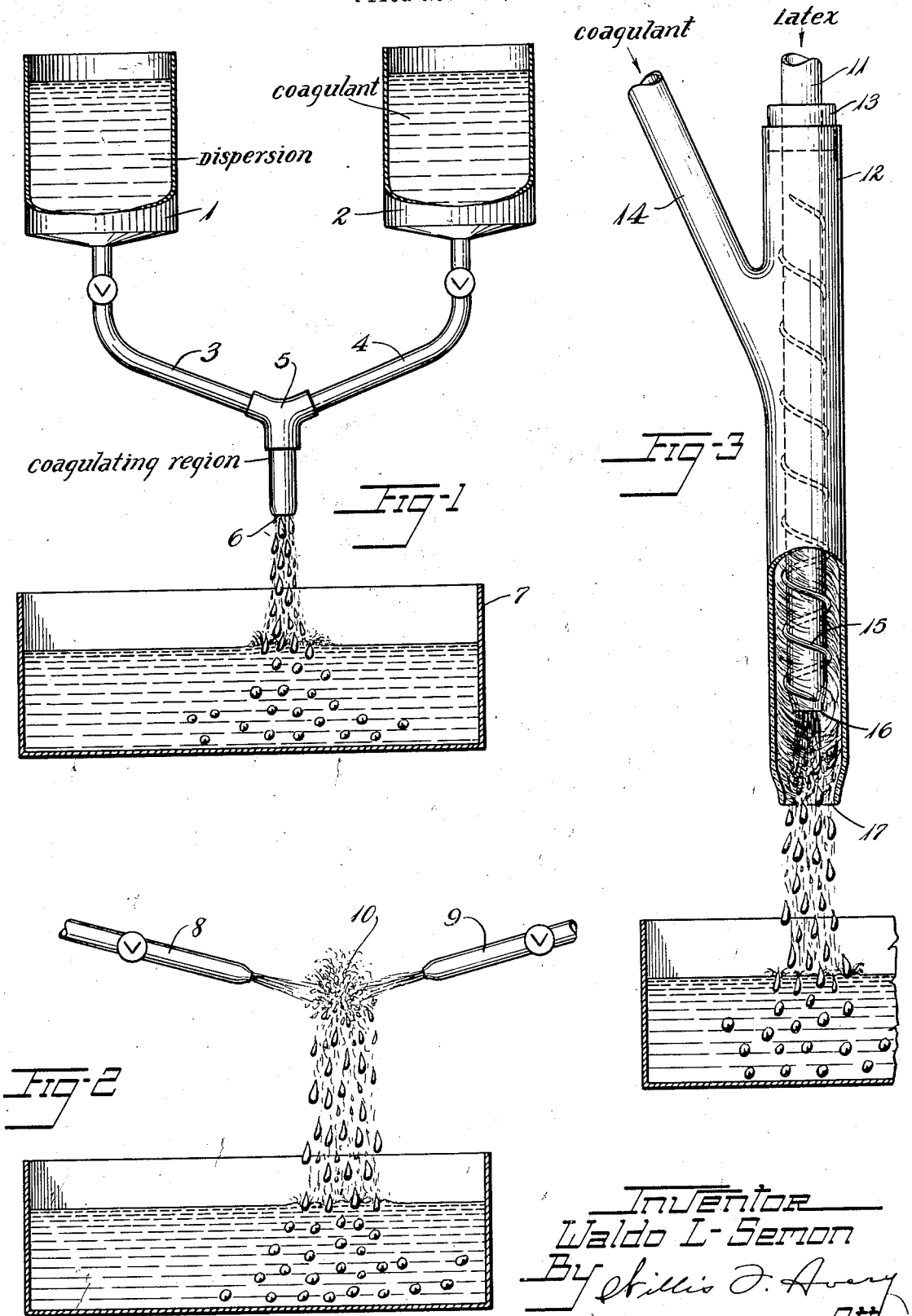

2,366,460

UNITED STATES PATENT OFFICE 2,366,460

METHOD OF COAGULATING DISPERSIONS

Waldo L. Semon, Silver Lake, Ohio, assignor to The B. F. Goodrich Company, New York, N. Y., a corporation of New York Application November 29, 1940, Serial No. 367,821

7 Claims. (Cl. 260—84.5)

This invention relates to a method and an apparatus for coagulating dispersions. More particularly it relates to the coagulation of rapidly coagulable dispersions such as latices of polymeric substances like synthetic rubber. Still more particularly it relates to the coagulation of aqueous dispersions of conjugated diene polymers or copolymers such as are prepared by an emulsion polymerization process, including for examples latex-like dispersions containing polymeric butadiene, isoprene, dimethyl butadiene or chloroprene or copolymers of such dienes with one or more other unsaturated organic compounds such as other dienes, acrylic nitriles, acrylic esters, styrene, vinylidene chloride and the like.

In the coagulation of synthetic rubber latices or other dispersions by the addition of a suitable coagulant such as an acid, alcohol or salt solution which brings about coalescence of the dispersed globules through some physical or chemical action, it is often desirable to carry out the operation in a manner which rapidly and continuously produces a loose finely divided coagulum rather than a firm compact mass. For instance, if synthetic rubber is to be treated with an aqueous stabilizing solution immediately after coagulation as in the manner described in the copending application of Waldo L. Semon and Charles F. Fryling, Serial No. 362,324 filed October 23, 1940, or if the synthetic rubber after separation from its latex contains occluded non rubber-like material, such as fatty acids present from the acid coagulation of a soap stabilized synthetic latex, which is to be removed by extraction or by washing, it is necessary that the coagulum be in the form of finely divided crumbs or curds so that these processes may be facilitated.

The obtainment of small crumbs of coagulum while using a continuous process has not been possible by the methods of coagulation known to the prior art. When latex is mixed with coagulant in suitable pans or tanks and allowed to stand, as is the practice in coagulating natural rubber latex at the rubber plantations, the separated particles lump together and form a firm coherent mass. The continuous processes which are known for the production of natural rubber from its latex yield the coagulum as continuous sheets or strips. Other coagulating methods which involve adding the coagulant to the latex in a container, stirring or otherwise agitating the mass until coagulation is complete and then discharging the coagulated rubber and mother liquor from the container, are of the nature of batch processes rather than continuous processes and require such a considerable handling of material that they are not well suited to large scale production use. Moreover when these processes are applied to synthetic rubber latices greater difficulty in obtaining the coagulum in a finely divided form is experienced inasmuch as synthetic rubber latex coagulates much more rapidly and the coagulated particles exhibit a greater tendency to lump together.

This invention has as its principal object the provision of a rapid and continuous method of completely coagulating dispersions in such a manner that a small particle sized coagulum is formed. A more particular object is to provide an economical method of coagulating synthetic rubber latices, which is continuous, which may easily be adapted for large scale production use and which results in the obtainment of synthetic rubber in a form which readily can be washed, extracted or otherwise processed. Still another object is to provide simple apparatus for use in this process. Other objects will appear hereinafter.

These objects are accomplished in this invention by a method of coagulation which broadly involves bringing into contact a dispersion and a liquid coagulant for said dispersion in such a manner that a turbulent mixing or intermingling of dispersion and coagulant continuously is effected. During such intermingling an exceedingly efficient and intimate contact of coagulant particles with dispersed particles is brought about and a rapid aggregation and flocculation of the dispersed particles occurs throughout the continuously moving mass of the liquid but the turbulent motion maintained therein prevents the formation of a continuous clot and insures the appearance of small discontinuous particles or curds of the coagulated material. After the turbulent mixing in the continuously flowing fluid has been continued for a time sufficient to coagulate the dispersion completely, the flocks or curds of coagulum which remain in suspension in the dispersing medium are continuously expelled from the coagulating region and separated from the dispersing medium or otherwise treated as desired.

The turbulent mixing or intermingling of coagulant and dispersion in a continuously flowing stream, which is an essential feature of this invention, may further be distinguished from other methods of mixing a dispersion with a coagulant therefor by ordinary stirring or otherwise agitating individual batches of the two liquids, in that in this process only a relatively small amount of the two liquids are in contact at a given point and at a given time and are continuously flowing in a turbulent manner away from that point, while with stirring in a batch process there is necessarily a large excess of either coagulant or dispersion at some given point at some given time. In other words by this method mixing takes place simultaneously throughout the entire mass of the liquid while with stirring in a batch process the actual mixing first occurs in the liquid closely surrounding the stirrer, the result being that by the use of this process coagulation is completed more rapidly and a smaller particle sized coagulum is formed.

It should also be mentioned that throughout the specification and in the claims the term "turbulent" in reference to the manner of mixing or the type of flow is used in its technical sense to describe a violent completely erratic condition of the liquid particles substantially throughout the entire mass of the liquid.

This invention is susceptible of considerable variation and modification in the manner of its practical application, particularly as regards the nature and proportions of the material coagulated and the coagulant, the exact method of mixing the liquids in a turbulently flowing manner, the operating conditions and the mechanical and engineering aspects involved in the carrying out of the process and in the construction of apparatus.

Of the drawing:

Fig. 1 is a diagrammatic representation of one method of carrying out the process.

Fig. 2 illustrates another suitable arrangement for carrying out the invention.

Fig. 3 is a side elevation of an apparatus used in still another embodiment of the invention.

In the practice of this invention according to Fig. 1, a dispersion such as synthetic rubber latex and a liquid coagulant for the dispersion such as a dilute acid are stored in separate tanks 1 and 2 or other suitable containers and are allowed to flow from their respective tanks through separate pipes or conduits 3 and 4 to a region 5 where the streams meet, the two liquids intermingle and coagulation occurs. The small curds of coagulum, surrounded by a clear serum are then allowed to flow from the coagulating region at 6 into a collecting receptacle 7 which preferably contains a non-coagulating liquid medium.

Fig. 2 shows another method of bringing streams of coagulant and dispersion into contact. In this method coagulant flows from an orifice 8 and meets a stream of dispersion flowing from a similar orifice 9. The two streams impinge and turbulent mixing and coagulation occurs in the region 10. Obviously various other arrangements for bringing the coagulant and dispersion into coagulating relation may be devised.

As has been mentioned above, it is essential that turbulent intermixing of the coagulant and the dispersion be maintained in the coagulating region. When piping arrangements such as those illustrated in Figs. 1 and 2 of the drawing are employed to bring the liquids into contact, turbulent intermixing may best be insured by allowing the liquids to flow together at a velocity which is in excess of their critical velocity. It is a well known principle in fluid flow that turbulent flow, as contrasted to streamlined or viscous flow, occurs in a fluid stream when the velocity is greater than the critical velocity. The critical velocity is determined by the diameter of the tube or pipe through which the liquid is flowing, and by the density and viscosity of the fluid. These factors, together with the velocity of the fluid, regulate the type of flow in a manner expressed by the mathematical function $$\frac{DUP}{Z}$$

where D is the inside diameter of the pipe, U the average velocity of the liquid, P its density and Z its viscosity. This function is known as the Reynolds criterion or Reynolds number and is a pure number. Turbulence occurs only when a certain critical minimum value is exceeded. This minimum is about 7.5 to 9.5 when D is measured in inches, U in feet per second, P in pounds per cubic foot and Z in centipoises, or is 2100–2300 when D is measured in feet, U in feet per second, P in pounds per cubic foot and Z in pounds per second per square feet.

By allowing the liquid in the two pipes to flow at a velocity greater than the critical velocity, turbulent flow is maintained in each of the conduits and turbulent intermingling takes place in the coagulating region. However, it is not essential that the velocity of flow in both or either of the conduits be maintained above the critical value since turbulence may occur at the junction of the two streams if only one stream has a velocity greater than the critical or if the combined effect of two streams, both of which are flowing at a rate less than the critical, is to produce at the junction a single stream having a velocity greater than the critical. It is essential that there be turbulent flow in the coagulating region since streamline or viscous flow produces less efficient mixing and incomplete coagulation.

Generally speaking the velocity of flow in the tubes or pipes leading to the coagulating region and in the coagulating region itself may be maintained above the critical value by first calculating the rate of flow necessary to produce turbulence from known factors for the materials and apparatus used, and then forcing the liquids through the conduits at a pressure sufficient to produce the desired velocity. In some instances the hydrostatic head of liquids at atmospheric pressure will be sufficient while in other cases it will be desirable to employ pressure higher than atmospheric. The rate of flow of the fluid in the conduit may be measured by any ordinary method such as by the use of meters or by measuring the displaced fluid. Measurement of the density and viscosity of the fluids, that is, of the dispersion and the coagulant, may be accomplished in the ordinary way. Since the diameter of the conduit is also known, it becomes a comparatively simple manner to calculate the velocity necessary to produce turbulent motion. In such calculations corrections may be made for other factors which influence the rate of flow such as the nature of the material of which the conduit is constructed, the shape of the conduit and the bends, elbows or other irregularities which may be present in the piping system. Standard tables of correction factors are available and are familiar to those skilled in the art.

In simple apparatus it is more difficult to apply the chemical engineering relationships and data which are available for fluid flow in industrial piping systems. It may be desirable therefore to make use of purely empirical methods in insuring a velocity great enough to produce turbulence or it may be possible to induce turbulence in the coagulating region by other means such as by providing irregularly shaped obstacles in the path of the liquid thereby producing a highly erratic movement in the stream. One simple means of inducing turbulence is to insert a helix in the path of the flowing liquid.

The conduits leading to the region where mixing and coagulation occurs may be varied in size and in shape within relatively wide limits to suit the requirements in regard to the nature of the dispersion and the capacity of the equipment. These conduits may be of any desired shape in cross section such as round, square, oval or of irregular shape and may be either straight, coiled or bent into any other desired position. They may be constructed of any suitable material such as iron, steel or other metal, glass, rubber or the like, the only precaution being to select a material which is not attacked by the coagulant or dispersion employed. As a general rule, other things being equal, the smaller the diameter of the tube, the more rapid the rate of flow and the more ready the attainment of the desired velocity.

The region where the coagulant and dispersion are mixed and where coagulation actually occurs may partake of a wide variety of forms. Thus, the region may be simply another pipe or conduit through which mixing coagulant and dispersion flows. In such case the length of the pipe will depend upon the time required for coagulation to occur, since coagulation must be completed before the mixture leaves the coagulating region. If the dispersion to be coagulated is a soap stabilized latex of a butadiene polymer, for example, and if the coagulant is a dilute acid, coagulation is practically instantaneous and the length of the pipe need be only very short, say 2 inches to 1 foot. If coagulation is less rapid the region through which the coagulant and dispersion mix must be of sufficient dimensions to allow the liquids to remain in contact for a longer time interval. The walls surrounding the coagulating region should be constructed of a material such as metal or glass to which the coagulum does not adhere since this will avoid difficulties caused by plugging up of the apparatus. The size of the pipe, and particularly of the opening through which the coagulum is expelled from the coagulating region should be of approximately the same diameter as the desired diameter for the coagulum particles. Thus when an orifice of one inch is provided, coagulum particles of a greater diameter than one inch cannot be expelled from the coagulating region until further disintegrated.

Instead of employing a piping arrangement as the coagulating region, other means may be provided for intermingling of the coagulant and the dispersion. For example in the practice of the invention by simply impinging a stream of coagulant upon a stream of dispersion as illustrated in Fig. 2, the coagulating region is not surrounded by any walls but is located in the body of the descending stream.

The practice of the invention may be more readily understood and appreciated by the following description of a simple specific embodiment thereof in which reference will be made to Fig. 3 which shows an apparatus used in this embodiment.

Referring to Fig. 3, the apparatus consists of two tubes 11 and 12, which may be made of glass, hard rubber or some other material which is not attached by the coagulant and to which the coagulated particles do not readily adhere, ar- ranged concentrically as shown. The outer tube 12 has an inside diameter of $\frac{7}{8}$ inch and the inner tube 11 has an inside diameter of $\frac{5}{32}$". The inner tube 11 is rigidly centered in the outer tube 12 by means of a cork or rubber support 13. The outer tube is provided with a side arm or entrance 14. A wire or glass helix 15 or some other suitable means to impart turbulence to the liquid flowing through the outer tube is interspaced between tubes 11 and 12. Both tubes are restricted at their lower ends into jets 16 and 17, but jet 17 is preferably not restricted to such an extent that the inner tube may not pass therethrough, jet 17 having a diameter of $\frac{9}{32}$ inch and jet 16 having a diameter of $\frac{3}{32}$ inch.

In operation, a coagulant which is 0.25 to 0.6% sulfuric acid is introduced through side arm 14 into the outer tube 12 while a synthetic rubber latex, prepared by the emulsion polymerization of a mixture of butadiene and acrylonitrile in presence of a fatty acid soap as emulsifying agent, is simultaneously introduced into the inner tube 11. As the coagulant flows around the helix 15 it acquires a turbulent motion and the latex is introduced into this turbulent stream at 16. Latex and coagulant intermingle in the coagulating region between 16 and 17 and coagulum is formed. The turbulent motion in the intermingling liquids combined with a swirling effect acquired by the flowing stream serve to twist the coagulum off in short spurts as it is discharged through jet 17, the outer layer of the particles being given a smooth surface by this twisting motion. Small spherical particles of a diameter equal approximately to that of jet 17 are formed and discharged. These smoothed spherical synthetic rubber particles show little tendency to stick together but are preferably caught in a tank 18 containing an agitated liquid such as water or a dilute alkaline solution further to prevent sticking together of the coagulated particles.

The construction and operation of the coagulating nozzle used in this specific example may be varied in accordance with the nature of the dispersion and the coagulant employed and also with respect to the particle size of coagulum desired. The distance the outer tube projects over the inner tube and the rate of flow of liquid through the two tubes will be determined by the time required for the formation of coagulum after contact of coagulant with the dispersion. When this is substantially instantaneous as in the case when soap stabilized diene polymer or copolymer dispersions are coagulated with dilute acids, it is desirable that the outer tube projects only slightly over the inner tube and that the rate of flow be rapid. When a longer time of contact of coagulant and dispersion is required the inner tube may be raised upward any required distance to allow the streams to intermingle for a longer time and the rate of flow may be reduced until coagulation is complete before the particles reach the agitated liquid in tank 18. With an arrangement such as that shown in Fig. 3, wide variation is possible while still maintaining turbulent intermixing in the coagulating region.

This invention is not restricted to the coagulation of any particular dispersion but may be applied to many aqueous dispersions among which are dispersions of rubber, either natural or synthetic or artificially prepared dispersions of rubber, resins, and other dispersions. Mixtures of dispersions such as those of synthetic rubber and age resistors may be simultaneously coagulated by the method of this invention. As has been hereinabove suggested, the invention is particularly applicable to latices of synthetic rubber such as are prepared by the emulsion polymerization of conjugated dienes. The synthetic rubber latices may also contain substances such as emulsifying agents (for instance soap) which are present during the emulsion polymerization or substances added after polymerization such as pigments, accelerators, age resistors and the like.

The coagulant for the dispersion may be any substance which quickly coagulates the particular dispersion employed. For synthetic rubber latices dilute acids such as sulfuric, formic or acetic acid or salt solutions such as the alkali or alkaline earth chlorides or bisulfates are conveniently employed. It is preferred to make use of a dilute acid such as 0.2 to 1% sulfuric acid solution when coagulating soap stabilized dispersion of diene polymers or copolymers since rapid coagulation is thereby obtained.

The relative amounts of dispersion and coagulant which are mixed in order to effect coagulation may be varied considerably, and are not critical. It is convenient to dilute the dispersion and the coagulant to such an extent that about equal amounts of coagulant and latex may be fed into the coagulating region.

It will be understood that numerous other modifications may be made in the practice of the invention without departing from the spirit and scope of the appended claims.

I claim:

1. A method for producing small discrete crumbs of a butadiene polymer from an aqueous dispersion of the said polymer which comprises continuously introducing flowing liquid streams, comprising a continuous body of flowing liquid, of the said dispersion and of a liquid coagulant for said dispersion into a coagulating region, turbulently intermixing the said dispersion and the said coagulant in the said coagulating region, the turbulent intermixing being effected by the internal forces provided by the said flowing liquid streams, whereby to coagulate the dispersion and form an aqueous slurry containing small discrete crumbs of butadiene polymer surrounded by aqueous liquid, discharging the said aqueous slurry from the coagulating region into a further quantity of aqueous liquid whereby to prevent agglomeration of the said crumbs, and finally separating the butadiene polymer in the form of the said small, discrete crumbs from the aqueous liquid.

2. A method for producing small, discrete crumbs of a butadiene polymer from an aqueous dispersion of the said polymer which comprises continuously introducing turbulently flowing liquid streams, comprising a continuous body of flowing liquid, of the said dispersion and of a liquid coagulant for said dispersion into a coagulating region, turbulently intermixing the said dispersion and the said coagulant in the said coagulating region, the turbulent intermixing being effected by the internal forces provided by the said turbulently flowing liquid streams, whereby to coagulate the dispersion and form an aqueous slurry containing small, discrete crumbs of butadiene polymer surrounded by aqueous liquid, discharging the said aqueous slurry from the coagulating region into a further quantity of agitated aqueous liquid whereby to prevent agglomeration of the said crumbs, and finally separating the butadiene polymer in the form of small, discrete crumbs from the aqueous liquid.

3. A method for producing small, discrete crumbs of a butadiene polymer from an aqueous dispersion of the said polymer which comprises continuously introducing a flowing liquid stream of said dispersion into the center of a turbulently flowing annular stream of a liquid coagulant for said dispersion, each of said liquid streams comprising a continuous body of flowing liquid, turbulently intermixing the said dispersion and the said coagulant in the coagulating region formed by the junction of the said streams, the turbulent intermixing being effected by the internal forces provided by the said flowing liquid streams, whereby to coagulate the dispersion and form an aqueous slurry containing small, discrete crumbs of butadiene polymer surrounded by aqueous liquid, discharging the said aqueous slurry from the coagulating region into a further quantity of agitated aqueous liquid whereby to prevent agglomeration of the said crumbs, and finally separating the butadiene polymer in the form of the said small discrete crumbs from the aqueous liquid.

4. The method of claim 1 wherein the dispersion is a synthetic rubber latex prepared by the polymerization of butadiene in an aqueous emulsion containing soap.

5. The method of claim 1 wherein the dispersion is a synthetic rubber latex prepared by the polymerization of a mixture of butadiene and acrylonitrile in an aqueous emulsion containing soap, and the coagulant is a dilute acid.

6. The method of claim 1 wherein the dispersion is a synthetic rubber latex prepared by the polymerization of a mixture of butadiene and styrene in an aqueous emulsion containing soap, and the coagulant is a dilute acid.

7. The method of claim 3 wherein the dispersion is a synthetic rubber latex prepared by the polymerization of butadiene in an aqueous emulsion containing soap.

WALDO L. SEMON.